United States Patent [19]
Marshall

[11] Patent Number: 6,126,830
[45] Date of Patent: Oct. 3, 2000

[54] METHOD AND APPARATUS FOR TREATING MEDICAL WASTE WATER

[76] Inventor: Judith M. Marshall, 353 Apple Ridge, Apple Creek, Ohio 44606

[21] Appl. No.: 09/151,076

[22] Filed: Sep. 10, 1998

Related U.S. Application Data

[60] Provisional application No. 60/067,215, Sep. 10, 1997.

[51] Int. Cl.[7] .................................. A62D 3/00; C02F 1/78
[52] U.S. Cl. .................... 210/627; 210/760; 210/203; 210/195.1; 422/28; 588/258
[58] Field of Search ...................... 210/627, 702, 210/758, 760, 195.1, 202, 203, 205, 764; 588/258; 422/28, 32

[56] References Cited

U.S. PATENT DOCUMENTS

| | | | |
|---|---|---|---|
| 4,052,960 | 10/1977 | Birkbeck et al. | 210/169 |
| 5,077,007 | 12/1991 | Pearson | 210/760 |
| 5,427,693 | 6/1995 | Mausgrover et al. | 210/760 |
| 5,547,582 | 8/1996 | Waibel | 210/664 |
| 5,820,541 | 10/1998 | Barrera | 210/760 |

*Primary Examiner*—David A. Simmons
*Assistant Examiner*—Frank M. Lawrence
*Attorney, Agent, or Firm*—Plunkett & Cooney, P.C.

[57] ABSTRACT

Medical waste water is treated by passing it through a bioremediation tank and, thereafter, treating the water with ozone.

7 Claims, 2 Drawing Sheets

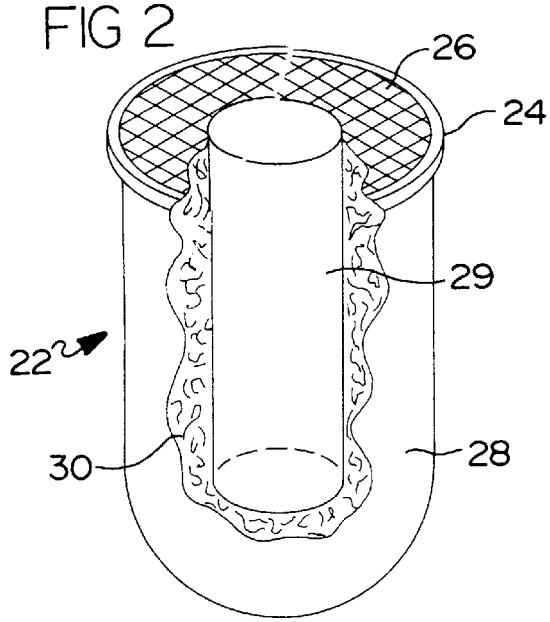
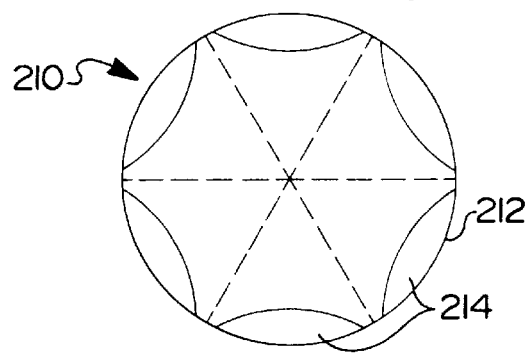
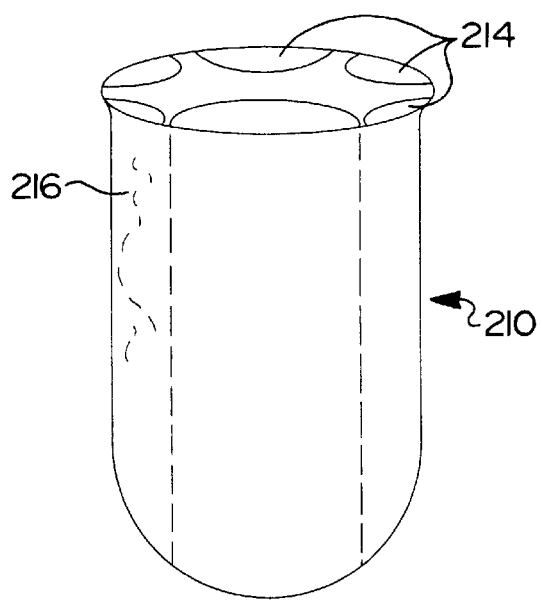

METHOD AND APPARATUS FOR TREATING MEDICAL WASTE WATER

This application claims benefit of provisional application No. 60/067,215, filed Sep. 10, 1997.

BACKGROUND OF THE INVENTION

1. Field of the Invention

The present invention relates to a method and apparatus for treating medical waste water in preparation for the environmentally friendly disposal thereof. More particularly, the present invention relates to an apparatus for treating medical waste water which is a by-product of an embalming process, in preparation for the environmentally friendly disposal thereof.

2. Description of the Background Art

In the fields of medicine and mortuary science, medical waste water is generated through various processes, and this waste water may have added chemicals such as embalming fluid or formaldehyde, in addition to naturally ocurring compounds such as fats, oils, blood, bacteria or viruses. In previous years, before the public and the government became environmentally sophisticated, this type of waste water was believed safe for processing by waste water treatment facilities, and was diluted with clean water and subsequently flushed down the drain. However, such treatment of potentially hazardous medical waste water is no longer acceptable in today's social and regulatory climate. State and Federal agencies are increasingly regulating effluents from both private and industrial sources. Disposing of medical wastes, including fluid wastes from embalming processes, can also be very expensive if these wastes must be treated as hazardous wastes.

In addition, many rural or outlying mortuary processing facilities are located on septic fields, and it is critical to treat the waste water from embalming and related processes, before placing it into a septic system, in order to avoid poisoning the septic field and to keep the septic system functioning properly over the long term.

Some previous patents have addressed the problem of treating medical waste water or mixed wastes. Exemplary summaries of some previously published patents in this general area follow.

U.S. Pat. No. 5,454,953 to Waibel discloses a process for the collection and treatment of biological waste which is generated during an embalming procedure. In the method of Waibel, the waste is first filtered to remove coarse solids which are later dried and incinerated. Then, the remaining liquid is distilled off in a boiling process, and the residue left from the distillation is incinerated with the solids from the filtration step. Finally, the distilled liquid is passed through a final bed filter to remove light organics and to provide an end product which is environmentally non-contaminating.

U.S. Pat. No. 5,520,888 to Berndt discloses a reactor for treating both solid waste and mixed solid and liquid biomedical wastes, in which the waste to be treated is first intermixed with ice which has had a disinfecting concentration of ozone trapped therein, and the waste and ice mixture is then passed through at least one shredder/grinder where it is broken into smaller particles to form a slurry. As the temperature of the slurry rises, entrapped ozone is released in a sustained manner to oxidize and disinfect the waste. Fluids are separated from a sludge which is formed by the process, allowed to settle in a liquids basin, and then filtered and re-used or discharged into a sewage treatment facility. The primary thrust of the Berndt reference appears to be on the solids component of the waste, and the treatment of the liquids portion is somewhat abbreviated. Berndt exclusively teaches the use of at least one, and preferably two shredder/grinders to chop up the waste, which is really not necessary for waste which is primarily fluid with some solid particles entrained therein.

A need still exists in the art for an improved method and apparatus for treating medical waste water which is suitable for use with septic systems and which is relatively simple to use.

SUMMARY OF THE INVENTION

The present invention provides a method and apparatus for treating medical waste water which involves the use of a biological treatment device which includes active biological agents. The method and apparatus hereof also includes oxidation of the waste with an oxidizing agent, which is preferably ozone, to change potentially hazardous chemicals into more environmentally friendly compounds.

A method of treating medical waste water according to the present invention, generally, includes the steps of a) precipitating formaldehyde from the water filtering the waste water through a first filter to remove larger solids and formaldehyde particulate therefrom; c) passing the waste water through a bioremediation treatment chamber, the bioremediation chamber including active biological agents, and d) adding an oxidizing agent to the medical waste water. The first filter and bioremediation treatment chamber are preferred to be combined into a single unit. The method may also include a step of adding a basic material to raise the pH of the waste water to a value in a range of 6–8. The method may also include a step of adding a defoamer.

An apparatus for treating medical waste water in accordance with the present invention, generally, comprises a treatment tank having an inlet and an outlet, a filter in fluid communication with the treatment tank, a conduit for cycling waste water through a treatment cycle and back to the tank, an ozone generator in communication with the conduit for adding ozone to the waste water as part of the treatment cycle, a pump for pumping waste water through the conduit in the treatment cycle, a discharge port for draining treated waste water out of the system, and an adjustable valve in the conduit, the valve having a first position for cycling waste water through the treatment cycle, and a second position for routing waste water to the discharge port.

Preferably, the apparatus includes a final filter upstream of the discharge port for removing ozone from the waste water.

Accordingly, it is an object of the present invention to, provide a method and apparatus for treating medical waste water to make the waste water safe for disposal in septic systems.

It is a further object of the present invention to provide a method and apparatus for treating medical waste water which does not generate a large amount of solid waste.

It is yet a further object of the present invention to provide a method and apparatus for treating medical waste water which includes a bioremediation device for breaking down fats and oils.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2 is a perspective view, partially cut away, of a bioremediation filter apparatus which is one component of the apparatus of FIG. 1;

FIG. 3 is a top plan view of a filter bag for use herein, and

FIG. 4 is a perspective view of the filter bag.

DETAILED DESCRIPTION OF THE PREFERRED EMBODIMENT

Figure 1:
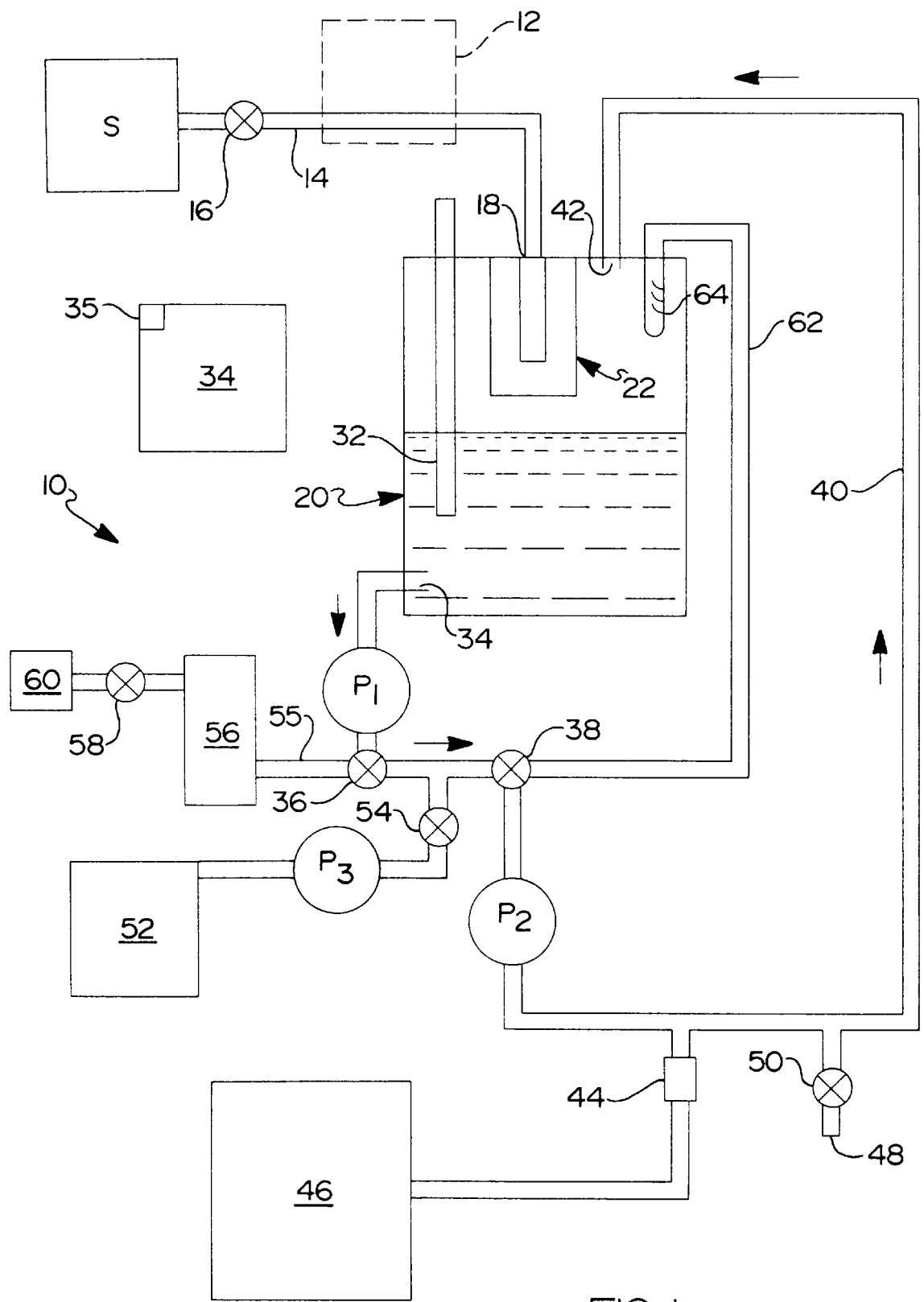
FIG. 1 is a schematic diagram of a medical waste water treatment apparatus in accordance with the present invention.

Referring now to the drawings, a medical waste water treatment apparatus in accordance with the present invention is shown generally at 10. As used throughout the present specification and in the claims, the term "medical waste water" is intended to mean water-based fluids which are a by-product of medical processes such as surgeries, invasive medical inspections of internal body parts, by optical instruments, autopsies, the embalming of cadavers in funeral homes, and the like. Such medical waste water may contain some entrained or suspended solids, fats, oils, chemicals which ale by-products of medical procedures, blood, and possibly other materials in a water base. The apparatus 10 of the present invention is not intended for use with medical waste which contains more than a small amount of solids therein.

Medical waste water for treatment is generated by a source S which may be an embalming table or a collection vessel from a medical procedure. The medical waste water may, optionally, be accumulated in a storage reservoir 12 which is shown in phantom. The medical waste water flows from the source S through a conduit 14, wherein the flow rate may be regulated by a first valve 16, through a first inlet 18 and into a treatment tank 20. The medical waste water enters the tank 20 by passing through a bioremediation filter 22. As best shown in FIG. 2, the bioremediation filter 22 includes a metal flange ring 24 at the top thereof, the flange ring surrounding a flat section of wire mesh screen 26. A durable and replaceable main filter bag 28, which is preferably formed from polypropylene, is attached to and suspended from the flange ring 24. The main filter bag 28 is preferred to be an 800 micron filter. A coarse 20 mesh inner bag 29 may, optionally, be provided inside the main filter bag 28 to help trap larger solid materials. The main filter bag 28 is filled with a filter material 30 which is impregnated with active biological agents such as oil eating bacteria. Fats and oils which are trapped on the filter material 30 will be consumed by the biological agents therein. A preferred filter material is commercially available under the mark 'OIL GATOR' from the AARC corporation of the U.S. Department of Agriculture.

After passing through the bioremediation filter 22, waste water accumulates in the treatment tank 20. The treatment tank 20 is provided with a level sensor 32 in electrical communication with a controller 34 which is capable of shutting off flow to the tank 20 if the level of fluid therein gets too high. The controller 34 also controls the various pumps and valves enumerated herein, preferably through the inclusion therein of a microprocessor 35.

A first pump P1 is provided to draw waste water out of the treatment tank 20 through an outlet 34 located near the bottom of the tank, and after leaving the pump P1, the waste water is initially routed past a second valve 36, which is a three-way flow control valve, and a third valve 38, which is also a three-way flow control valve, to a second pump P2 which then cycles the waste water through a treatment conduit 40 and back into the treatment tank 20 through a second inlet 42 in a repeating cycle.

While passing through the treatment conduit 40, the waste water receives an oxidizing agent from an injector 44 in fluid communication with the treatment conduit. In the preferred embodiment of the present invention, the oxidizing agent is ozone from an ozone generator 46.

Contaminant levels in the waste water may be monitored by drawing a sample from a sample port 48 through a fourth or sample valve 50. The sample port 48 comes off of, and is in fluid communication with, the treatment conduit 40, as shown.

When the level of contaminants in the waste water has been reduced to an acceptable level, a measured amount of a liquid base may be added from a base storage reservoir 52 through a fifth or metering valve 54 working in conjunction with a third pump P3. Optionally, a defoamer may also be mixed with the liquid base in the base storage reservoir 52.

After treatment of the waste is completed, the second valve 36 is switched to a position which sends the waste water through a discharge pipe 55 to a final filter 56 for removal of any ozone therefrom. The final filter 56 is preferred to be an activated carbon filter.

Upon leaving the final filter 56, the treated waste water, which has been rendered environmentally friendly, passes through a sixth valve 58 and into a drain 60. The drain 60 may lead to a septic system or to a municipal water treatment facility.

Periodic cleaning of the apparatus 10 hereof is accomplished by removing the bioremediation filter 22 and feeding a cleaning solution into the first inlet 18. Then, the second and third valves are 36, 38 are positioned so that the first pump P1 sends the cleaning solution through an auxiliary cleaning conduit 62 and to a rotating spray head 64 which sprays inside the tank 20 and cleans the walls thereof.

The present invention also encompasses a method of treating medical waste water as defined herein. A method according to the present invention begins with a step of passing the waste water through a bioremediation treatment chamber 22, the bioremediation treatment chamber having active biological agents therein. The next step in the method hereof is filtering the waste water through a first filter 28 to remove larger solids therefrom. In the preferred method according to the present invention, both of the first and second steps are accomplished at the same time by the use of the bioremediation filter 22. The next step in the method hereof is adding an oxidizing agent to the medical waste water. As noted, the preferred oxidizing agent is ozone, although hydrogen peroxide or other known oxidizing agents may be suitable for use with the method hereof. The method according to the present invention may also include cycling the medical waste water through a treatment conduit 40 and continuing to add oxidizing agent, as necessary, and may include an optional step of adding a basic material to adjust the pH of the waste water to a value in a range of 6 to 8.

Where the waste water includes embalming fluid, the fluid step in the process is to remove the formaldehyde from the waste water. This is done by either precipitation or by neutrategation of the adelhyde. Such techniques are well known to the skilled activists. After the formaldehyde treatment is effected, the waste water is, then, pumped through a dual purpose filter bag, as shown in FIGS. 3 and 4.

In FIGS. 3 and 4 there is shown an embodiment of a filter for use in removing particulated formaldehyde residuals.

The filter, which is generally, denoted ac 210 comprises an outer sheath 212 formed from a microporous filter material, such as paper, aclage or the like. Optimally, the filter sheath 212 is about 10 microns.

The filter 210 further includes a plurability of closed interior pockets 214 integrally formed with the sheath 212. Each pocket 214 contains a filtering medicine such as activated charcoal or the like.

In use the filter 210, may be a first stage in the tank 20 or may be interposed the value 16 and the tank 20 (downstream of the reservoir 12, if used). A pump (not shown) draws the water with the removable formaldehyde entrained therein through the filter 210 after precipitation of the formaldehyde. The filter traps the particles and the effluent passes through the pockets and into the tank 20, as described above.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention what is claimed is:

1. A method of treating medical waste water, comprising the steps of:

filtering the waste water through a first filter to remove larger solids therefrom;

passing the waste water through a bioremediation treatment chamber, the bioremediation chamber having active biological agents therein;

biologically treating the waste water in the bioremediation chamber; and adding an oxidizing agent to the medical waste water.

2. The method of claim 1, wherein the filtering step and the bioremediation treatment chamber are combined into a single step carried out in a bioremediation filter unit.

3. The method of claim 1, further comprising a step of adding a basic material to raise the pH of the waste water to a value in a range of 6–8.

4. The method of claim 1, wherein the waste water contains formaldehyde, and which further comprises; removing the formaldehyde utilizing a pocketed filter bag prior to filtering through the fluid filter.

5. The method of claim 4, wherein the formaldehyde is removed by precipitation; the method further comprising; removing the precipitate prior to filtering through the fluid filter.

6. An apparatus for treating medical waste water, comprising:

a bioremedial treatment tank having an inlet and an outlet;

a first filter comprising a filter bag including a filter material impregnated with active biological agents which is in fluid communication with the treatment tank;

a treatment conduit for cycling waste water through a treatment cycle and back to the tank;

an ozone generator in communication with the treatment conduit for adding ozone to the waste water as part of the treatment cycle;

a pump for pumping waste water through the conduit in the treatment cycle;

a discharge pipe connected to the treatment conduit for draining treated waste water out of the system; and an adjustable valve in the treatment conduit, the valve having a first position for cycling waste water through the treatment cycle, and a second position for routing waste water to the discharge pipe.

7. The apparatus of claim 6, further comprising a final filter in fluid communication with the conduit for removing ozone from the waste water.

* * * * *